United States Patent [19]

Levine

[11] Patent Number: 5,338,201
[45] Date of Patent: Aug. 16, 1994

[54] METHOD FOR TEACHING READING USING HAND-HELD READING GUIDE

[76] Inventor: Shirley S. Levine, 243 Weaver St., Apt. 9B, Greenwich, Conn. 06831-4245

[21] Appl. No.: 38,252

[22] Filed: Mar. 29, 1993

[51] Int. Cl.$^5$ .............................................. G09B 17/00
[52] U.S. Cl. ................................................ 434/178
[58] Field of Search ............... 434/178, 183, 433, 365; 401/6, 88, 7; 15/443, 437

[56] References Cited

U.S. PATENT DOCUMENTS

| | | | |
|---|---|---|---|
| D. 110,810 | 8/1938 | Kahn | 401/6 X |
| D. 168,227 | 11/1952 | Kather | 401/6 |
| D. 252,757 | 8/1979 | Sublett | 401/6 X |
| D. 317,941 | 7/1991 | Chao | 434/91 X |
| 830,495 | 9/1906 | Costello | 434/433 |
| 902,164 | 10/1908 | Orchard | 401/88 X |
| 2,173,451 | 9/1939 | Lorber | 401/88 X |
| 2,180,560 | 11/1939 | Stempel | 401/88 |
| 3,126,648 | 3/1964 | Strong et al. | 434/183 |
| 3,488,865 | 1/1970 | Erickson | 434/183 |
| 3,709,620 | 1/1973 | Miyamoto | 401/195 |
| 4,030,841 | 6/1977 | Balasty | 401/6 |
| 4,225,254 | 9/1980 | Holberg et al. | 401/6 X |
| 5,061,185 | 10/1991 | Cochran et al. | 434/178 |

FOREIGN PATENT DOCUMENTS

| | | | |
|---|---|---|---|
| 1016159 | 9/1957 | Fed. Rep. of Germany | 401/6 |
| 2622512 | 5/1989 | France | 15/437 |

OTHER PUBLICATIONS

Scrollmaster Ad., Dampp-Chaser Electronics, Inc. 1965.

*Primary Examiner*—Paul J. Hirsch
*Assistant Examiner*—Jeffrey A. Smith
*Attorney, Agent, or Firm*—Seymour Levine

[57] ABSTRACT

A method for teaching reading utilizes a reading guide having a letter director at one end which the student positions at the top of the first letter in each word read. As the student glides the reading guide from first letter to first letter the student is instructed to sub-vocalize the words read and to stop after reading the first sentence. After determining what the student previously knew about the subject matter and what has been learned the student continues, stopping periodically to question what has been learned until the all the material has been read.

2 Claims, 1 Drawing Sheet

U.S. Patent    Aug. 16, 1994    5,338,201
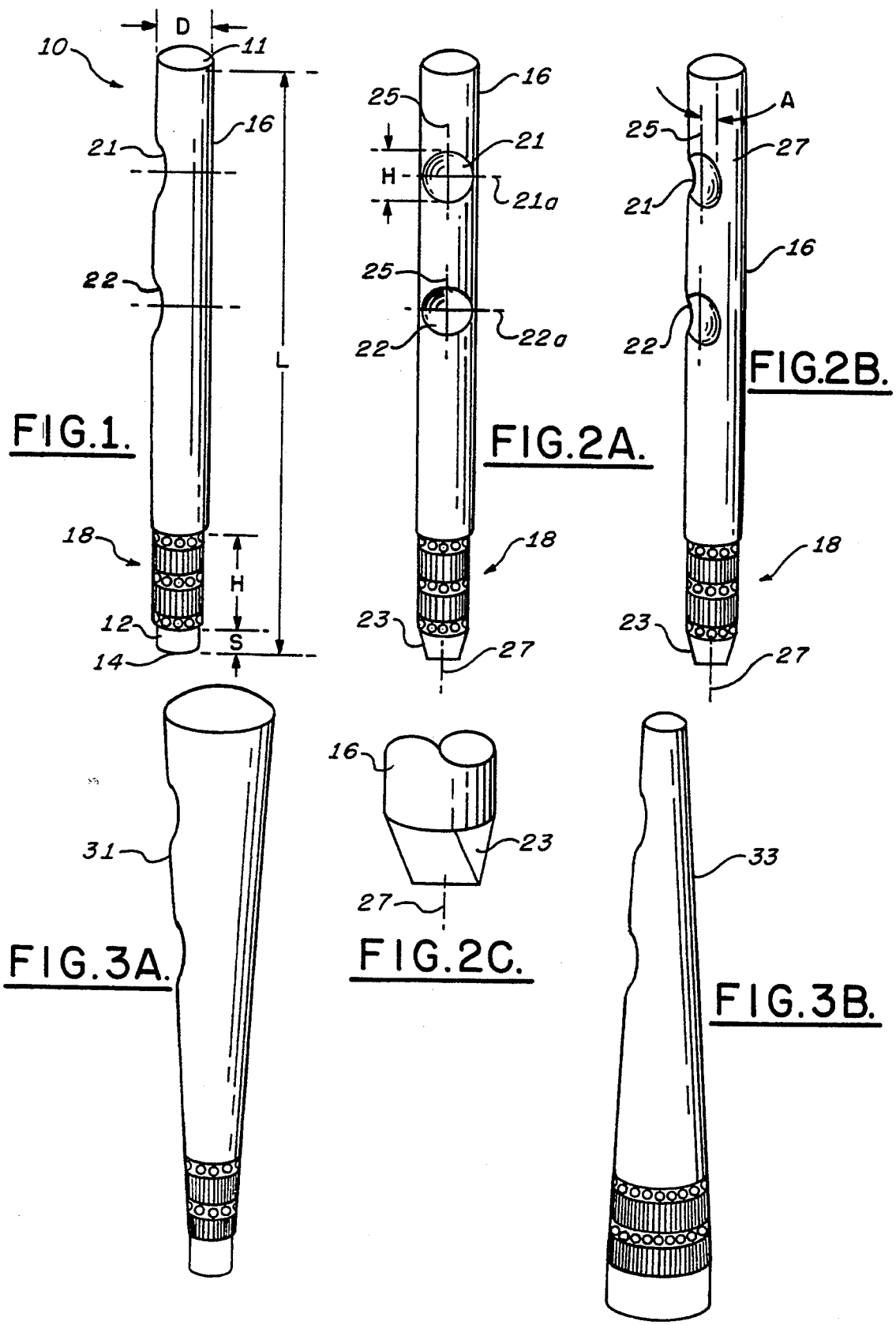

METHOD FOR TEACHING READING USING HAND-HELD READING GUIDE

BACKGROUND OF THE INVENTION

I have observed that the children who experience the most success in school are those who are "in love" with their books and other literature. Good students actually embrace their material, while pouring over it with rapt attention. They lean forward, touching and pointing to the words on the page with their fingers, pens, or pencils. At the same time, they are sub-vocalizing the words that they are reading. They consume with a passion, while they are literally "eating up" the printed matter.

In contrast, the "failing student" uses body language that says to his books, "I want nothing to do with you! Don't come near me and don't touch me!" He sits at arms distance from his books and refuses to touch them, even while trying to read. He is detached, unfocused, diffuse, and in a state of fight and flight.

Is the failing student learning disabled? Is he suffering from attention deficit deficiency? Is this underachiever work inhibited? Is he all of the above?

When dealing with a disabled reader, one cannot be absolutely sure of the etiology of the difficulty, since one is never really sure of the underlying causes of the deficiencies.

As early as 1925 attempts were made to identify the syndrome of developmental reading disability in disabled readers. This syndrome was separated from mental effect and brain damage. Much evidence was found in young students to show that poor visual memory for recognizing the printed word resulted in poor reproduction for recalling the word for writing and thus impaired reading and spelling. Poor auditory memory for words would result in the interference with their reproduction in speech and writing. Taken together, they resulted in poor speech patterns, meager and confused vocabulary, ungrammatical writing, and poor spelling. To further weaken the circuit, poor handwriting and poor spelling would then result in poor visual or auditory reinforcement of word patterns.

As a frame of reference, a neurological concept was developed, which described three levels of cortical elaboration by which the sense organs received sensations. It was noted that anatomically different brain areas gave rise to: level 1.) awareness of an external stimulus; level 2.) recognition of its concrete meaning; and level 3.) association of language meaning to the stimulus. It was at this third level—the word level—in the visual or auditory areas of the brain, that specific delays occurred. This language disturbance was found in cases of developmentally word-blind or word-deaf children. In word-blind children, tests showed that in the visual area the youngsters with specific reading difficulties could see the print clearly, recognize that they were seeing letters and words, yet could not read them, i.e. identify them as meaningful language symbols. Similarly, in word-deaf youngsters there was adequate hearing, they could identify sound correctly, but had difficulty in associating concepts with spoken words.

But the prognosis was good. It was found that, in a direct attack upon the child's educational problem, all sorts of behavioral and emotional disturbances, which had been the result of academic failure, generally subsided or disappeared.

SUMMARY OF THE INVENTION

A method for teaching reading, in accordance with the principles of the present invention, utilizes a reading guide having a letter director at one end which the student positions at the top of the first letter of each word to be read. The material to be read is placed, by the student, directly in front of the student. The student is then instructed to grasp the reading guide and position both arms about the reading material. Thus positioned and ready with the reading guide, the student is instructed to place the director above the first letter of the reading material. As the director is glided over each first letter in a word, the student is instructed to sub-vocalize the words and instructed to read only the first sentence and stop. At this juncture the student is requested to determine the most important word in the sentence, to state what the student knows about the material to be read, and compare what is already known to the information derived from reading the first sentence. The student is then instructed to continue reading and to stop periodically to question what was previously known and what new information was derived from the material.

The foregoing and other aspects of the invention will become more clearly evident from the following detailed description with reference to the accompanying drawings.

BRIEF DESCRIPTION OF THE DRAWINGS

FIG. 1 is sketch of an embodiment of the invention with a cylindrical director.

FIG. 2A is a sketch of an embodiment of the invention with a wedge shaped director.

FIG. 2B is a sketch of an embodiment of the invention showing thereon an offset angle of groove center liens from a reference line.

FIG. 2C is a sketch of a wedge shaped director.

FIGS. 3A and 3B are sketches of embodiments of the invention having tapered holders.

DESCRIPTION OF THE PREFERRED EMBODIMENT

Children learn to read by reading. If the literature is meaningful in content, whether it deals with fiction or non fiction, children will enjoy and grasp its meaning, provided there is careful guidance by the teacher. Initially, letter-sound association is best made through invented writing in response to stories read aloud by the teacher. Then, for the faltering reader, fluency is best advanced by again using literature while "echo reading" with the student. When independent reading occurs, instruction in reading for ideas, i.e., comprehension of the author's deeper meanings is the desired goal to be attained. Based on the framework described above and on my years of experience, I have devised an approach to retrain and remediate these children.

GETTING STUDENTS INTO A READING MODE AND HAVING THEM USE A MULTI-SENSORY APPROACH

The reader must learn that the first step in the reading process is to get ready to read. He is to assume a reading posture, much as the posture assumed by a diver before the dive or a runner at the start of a race. The importance of getting set to perform the reading task cannot be underestimated All Specialists and Parents should help these children to understand that getting into a READING MODE will ultimately spell success. With training, every child can become a good reader. And a good reader can become a more efficient learner.

So . . . Get Ready! Get Set! Go!

1. Sit up at a table with feet flat on the floor.
2. Place the literature straight up and down in front of you.
3. Lean forward with your chest touching the table and also touching the bottom of the page of literature.
4. Put both arms around the literature; one hand with fingers outstretched at the top of the page and the dominant hand holding the reading guide, to be described, for pointing.
5. With the fingernail of your thumb facing you, place your thumb in one of the grooves in the reading guide and grasp it with your thumb and index finger.
6. Place the tip of the reading guide above the first letter of each and every word in the passage, pointing the other end straight away from your body.
7. As you glide from first letter to first letter, sub-vocalize each and every word.
8. Read only the first sentence, or topic sentence in the paragraph, then stop!
9. In your judgement, determine which is the most important word in that first sentence. Circle it in red. This word should represent the subject, which you believe, the author plans to discuss in the reading material. Write the word in red above the paragraph. That word is the title. Draw a red line under the topic sentence. The title, the topic sentence, and the encircled word should make a match.
10. Ask yourself, "What do I know about this subject?" Verbalize everything that you already know about the subject. Speak into a mirror, if you wish.
11. Then, return to reading. Pick up your reading guide and read the literature, repeating the pattern for each and every paragraph. Note how the author develops his topic.
12. Compare what you already knew about the subject with the author's information. What more did you learn?

The student uses a multi-sensory approach; seeing, hearing, and touching the literature as he works with the material at hand. All the while he has the look of a high achieving student. He is in control of his body and he is already focusing and thinking about the subject at hand. These two elements assure attention and concentration and will lead to the comprehension of the author's surface meaning and the authors's deeper meaning. At last the child now owns a lifelong strategy for altering his attitude and his behavior. Before long, many of his difficulties will soon disappear.

Most of the memory for learning will happen through the small muscles of the hand, because the greatest emphasis will be on the kinesthetic element (specific pointing and sub-vocalizing) that reinforces the visual-auditory language association. The reading guide, as will be described, plays a central role in the student's accomplishments in the following manner:

A. student assumes a reading mode
  1. establishes a proper mental set in getting ready to read;
  2. imposes control over the large muscles of his body and quiets them down; and
  3. feels that he has a psychological advantage over his opponent (the literature);
B. pointing with reading guide and sub-vocalizing
  1. directs attention to the print;
  2. establishes left-right habits of progression;
  3. sequences letters of the words;
  4. refines eye-hand coordination;
  5. overcomes figure-ground difficulties by targeting the initial consonant or vowel of each and every word;
  6. relieves tension when eliminating the frantic search for the initial consonant or vowel; and
  7. increases memory for learning by utilizing the small muscles of the hand and speech mechanism.
C. focusing upon the first sentence and deciding upon the most important word in the topic sentence
  1. now understands what the author means to discuss;
  2. provoked into thought in reaction to the author's message;
  3. increases fluency and thus increases speed of comprehension;
  4. stays on task throughout the assignment;
  5. takes note of the author's style;
  6. is aware of the author's style when developing and writing a series of paragraphs on a specific topic.

At this juncture, it should be explained that the kinesthetic (pointing and speaking) aspect of the visual-auditory-kinesthetic approach is most heavily weighted in favor of the kinesthetic element. Most of the memory for learning, as previously stated, takes place through the small muscles of the hand. Thus, the student has been empowered to control his body and to independently satisfy his hunger for knowledge.

Refer to FIG. 1. A reading guide 10 in its preferred embodiment comprises a director 12 and a holder 16 which may be a cylinder and may be made of wood. The overall length L of the reading guide be may equal to 7 inches with a holder diameter D which may be equal to $\frac{1}{2}$ inch, much resembling the shape of a pencil. The top end of the holder 11 may be flat and the lower end 14 of the director 12 may be straight. The director 12 may be formed at the lower end of a one piece reading guide 10. In use, the director is positioned over the first letter of each word that the student reads, thus directing the student to this letter.

Two grooves 21 and 22 are carved into the holder 16. One of the two grooves, whichever is more comfortable, is selected by the student to support a thumb, when the reading guide is grasped (prehended) by a thumb and the index finger, during the reading process. Each groove 21 and 22 has a height H along the center line 25 and a width W along lines 21a and 22a which are perpendicular to the center line 25. Intersections of the lines 21a and 22a with the center line 25 respectively being the centers of the grooves 21 and 22.

The director 12 may be a cylinder of height S, which may be $\frac{1}{4}$ inch, with a flat end 14, much like an eraser at the top end of a pencil. Other shapes for the director, however, could serve as well, as for example the wedge shaped director 23 shown in FIGS. 2A and 2C wherein elements previously mention bear the originally assigned referenced numerals. Though the center line 25 of the grooves 21 and 21 are shown at the same angular position as the center line 27 of the director in FIG. 2A, it should be recognized that the grooves center line 25 may be at a selected angular offset from the director center line 27, which is the reference for the offset angle A, as shown in FIG. 2B.

Though the holder 16 is shown in FIGS. 1 and 2A as a circular cylinder, it should be apparent that this is not a necessity and that the other cylinder types and other shapes may be employed, as for example, the decreasing taper from top to bottom of holder 31 in FIG. 3A and the increasing taper of holder 33 in FIG. 3B.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A method for teaching reading utilizing a reading guide having a handle with at least one groove between first and second ends and a letter director extending from said second end to a director end comprising the steps of:

having a student place a page of reading material directly in front of said student;

instructing said student to position both arms about said reading material, said student positioning a first hand at top of said page and a second hand holding said reading guide;

informing said student to place thumb of said second hand in one of said at least one groove with the fingernail of said thumb facing said student; and telling said student to place said director end above the first letter of each word of said reading material.

2. A method in accordance with claim 1 further including the steps of:

instructing said student to sub-vocalize as said student glides said director end from a first letter of a word to first letters of subsequent words;

telling said student to read only the first sentence in the first paragraph and then to stop;

requesting said student to determine the most important word in said first sentence and then continue reading said first paragraph;

instructing said student to continue reading and repeat said telling and requesting steps for each paragraph in material being read;

informing said student to question himself or herself as to what said student had known of subject matter read; and instructing said student to compare what was already known with information derived from said reading material.

* * * * *